United States Patent
Zhou et al.

(10) Patent No.: US 12,531,172 B2
(45) Date of Patent: Jan. 20, 2026

(54) LOW RESISTANCE, HIGH VOLTAGE AND RESISTANCE STABLE PPTC MATERIAL AND MANUFACTURING

(71) Applicant: Littelfuse, Inc., Rosemont, IL (US)

(72) Inventors: Zhiyong Zhou, Shanghai (CN);
Jianhua Chen, Sunnyvale, CA (US);
Wei Zheng, Shanghai (CN)

(73) Assignee: Littelfuse, Inc., Rosemont, IL (US)

( * ) Notice: Subject to any disclaimer, the term of this patent is extended or adjusted under 35 U.S.C. 154(b) by 425 days.

(21) Appl. No.: 18/137,576

(22) Filed: Apr. 21, 2023

(65) Prior Publication Data
US 2023/0343494 A1    Oct. 26, 2023

(30) Foreign Application Priority Data
Apr. 22, 2022  (CN) .......................... 202210430720.6

(51) Int. Cl.
*H01C 7/02* (2006.01)
*H01C 1/14* (2006.01)
*H02H 9/02* (2006.01)

(52) U.S. Cl.
CPC ........... *H01C 7/028* (2013.01); *H01C 1/1406* (2013.01); *H02H 9/026* (2013.01)

(58) Field of Classification Search
CPC ....... H01C 7/028; H01C 1/1406; H02H 9/026
See application file for complete search history.

(56) References Cited

U.S. PATENT DOCUMENTS

| | | | |
|---|---|---|---|
| 8,446,245 B2 * | 5/2013 | Wang | H01C 7/027 338/21 |
| 9,431,822 B1 * | 8/2016 | Chen | H01C 17/0652 |
| 9,997,906 B1 * | 6/2018 | Yen | H01C 17/06586 |
| 10,711,114 B2 * | 7/2020 | Chen | H01B 1/20 |
| 10,777,340 B2 * | 9/2020 | Chen | C08L 27/16 |
| 10,784,026 B2 * | 9/2020 | Rutter, Jr. | H01C 17/06513 |
| 11,574,750 B2 * | 2/2023 | Yen | H01C 7/02 |
| 11,881,337 B2 * | 1/2024 | Chen | H01C 7/02 |
| 2008/0292533 A1 * | 11/2008 | Belmont | C09C 1/50 423/449.1 |

FOREIGN PATENT DOCUMENTS

| | | |
|---|---|---|
| CN | 102903469 A | 1/2013 |
| CN | 105321639 A | 2/2016 |
| CN | 109509599 A | 3/2019 |
| TW | 202011424 A | 3/2020 |
| TW | 202024212 A | 7/2020 |

* cited by examiner

*Primary Examiner* — Kyung S Lee
(74) *Attorney, Agent, or Firm* — KDW Firm PLLC

(57) ABSTRACT

A novel polymer positive temperature coefficient (PPTC) material, device, and method of fabrication. The PPTC device may include a PPTC body; a first electrode disposed on a first surface of the PPTC body and a second electrode disposed on a second surface of the PPTC body, opposite the first electrode. The PPTC body may include a polymer matrix; and a conductive filler, disposed in the polymer matrix. The conductive filler may include a tungsten carbide component comprising at least 30 volume percent of the PPTC body; and a carbon component, wherein a total volume fraction of the conductive filler comprises between forty volume percent and sixty five volume percent of the PPTC body.

12 Claims, 2 Drawing Sheets

LOW RESISTANCE, HIGH VOLTAGE AND RESISTANCE STABLE PPTC MATERIAL AND MANUFACTURING

CROSS REFERENCE TO RELATED APPLICATION

This application claims the benefit of priority to, Chinese Patent Application No. 202210430720.6, filed Apr. 22, 2022, entitled "Low resistance, high voltage and resistance stable PPTC material and manufacturing," which application is incorporated herein by reference in its entirety.

BACKGROUND

Field

Embodiments relate to the field of circuit protection devices, including fuse devices.

Discussion of Related Art

Polymer positive temperature coefficient (PPTC) devices may be used as overcurrent or over-temperature protection device, as well as current or temperature sensors, among various applications. In overcurrent or over-temperature protection applications, the PPTC device may be considered a resettable fuse, designed to exhibit low resistance when operating under designed conditions, such as low current. The resistance of the PPTC device may be altered by direct heating due to temperature increase in the environment of the circuit protection element, or via resistive heating generated by electrical current passing through the circuit protection element. For example, a PPTC device may include a polymer material and a conductive filler that provides a mixture that transitions from a low resistance state to a high resistance state, due to changes in the polymer material, such as a melting transition or a glass transition. At such a transition temperature, sometimes called a trip temperature, where the trip temperature may often range from room temperature or above, the polymer matrix may expand and disrupt the electrically conductive network, rendering the composite much less electrically conductive. This change in resistance imparts a fuse-like character to the PPTC materials, which resistance may be reversible when the PPTC material cools back to room temperature.

In many applications the performance requirements for a PPTC material are dictated by several considerations, including resistance during normal state operation, stability at a given operating voltage or maximum voltage, thickness requirements of a PPTC device, and stability against oxidation, to name a few requirements. In this regard, known PPTC materials used in many present day PPTC devices are often based upon carbon fillers dispersed in a polymer matrix. While these carbon based PPTC devices and systems are suitable for a broad range of applications, carbon-based PPTC devices may not be suitable for certain high voltage applications, such as systems that require relatively lower operating resistance. For example, (PPTC) material, using a carbon black (CB) filler exhibit stable resistance for medium voltage applications, for 6~8 mil (0.15~0.2 mm) CB based PTC material, some applications require use where the applied voltage can reach 20 V and the resistivity is less than 0.5 ohm-cm, at which voltage the CB based PTC material is not stable.

In order to meet low resistance requirements, instead of CB filled polymer, PPTC systems based upon nickel or carbide have been proposed, which systems are used at lower voltage applications such as 6V. In addition, the oxidation of nickel or carbide in such PPTC systems renders the resistance of these systems unstable, at least in some environments.

With respect to these and other considerations, the present disclosure is provided.

BRIEF SUMMARY

In one embodiment, a polymer positive temperature coefficient (PPTC) device may include a PPTC body; and a first electrode disposed on a first surface of the PPTC body and a second electrode disposed on a second surface of the PPTC body, opposite the first electrode. The PPTC body may include a polymer matrix; and a conductive filler, disposed in the polymer matrix. The conductive filler may include a tungsten carbide component comprising at least 30 volume percent of the PPTC body, and a carbon component, wherein a total volume fraction of the conductive filler comprises between forty volume percent and sixty five volume percent of the PPTC body.

In another embodiment, a composition for a polymer positive temperature coefficient (PPTC) device is provided. The composition may include a polymer matrix; and a conductive filler, disposed in the polymer matrix. The conductive filler may include a tungsten carbide component comprising at least 30 volume percent of the PPTC body; and a carbon component, wherein a total volume fraction of the conductive filler comprises between forty volume percent and sixty five volume percent of the PPTC body.

In an additional embodiment, a method of forming a polymer positive temperature coefficient (PPTC) device may include providing a polymer matrix; and adding a conductive filler to the polymer matrix. The conductive filler may include a tungsten carbide component comprising at least 30 volume percent of the PPTC body; and a carbon component, wherein a total volume fraction of the conductive filler comprises between forty volume percent and sixty five volume percent of the PPTC body

DESCRIPTION OF EMBODIMENTS

Figure 1:
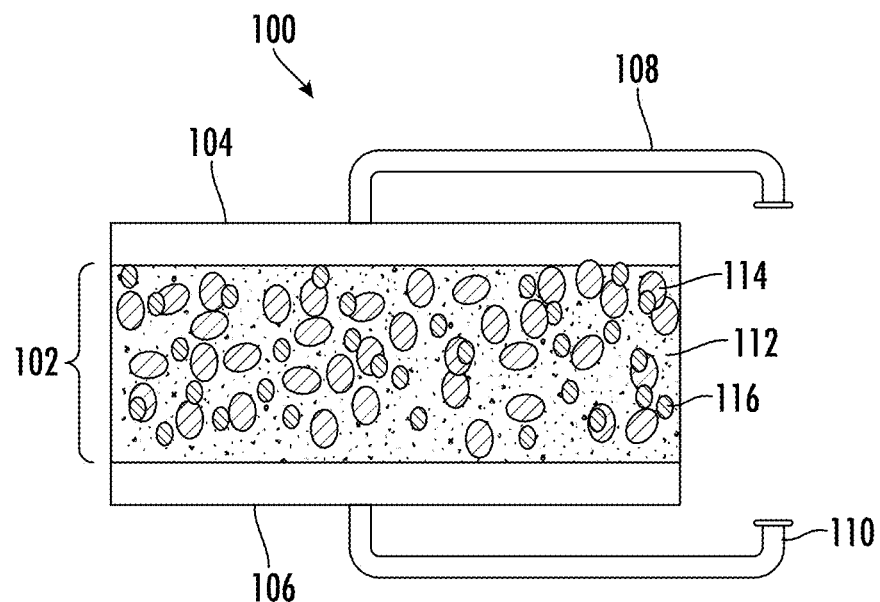
FIG. 1 depicts a side cross-sectional view of a PPTC device, according to embodiments of the disclosure.

The present embodiments will now be described more fully hereinafter with reference to the accompanying drawings, in which exemplary embodiments are shown. The embodiments are not to be construed as limited to the embodiments set forth herein. Rather, these embodiments are provided so that this disclosure will be thorough and complete, and will fully convey their scope to those skilled in the art. In the drawings, like numbers refer to like elements throughout.

In the following description and/or claims, the terms "on," "overlying," "disposed on" and "over" may be used in the following description and claims. "On," "overlying," "disposed on" and "over" may be used to indicate that two or more elements are in direct physical contact with one another. Also, the term "on,", "overlying," "disposed on," and "over", may mean that two or more elements are not in direct contact with one another. For example, "over" may mean that one element is above another element while not contacting one another and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect.

In various embodiments, materials are provided for forming a PPTC device, where the PPTC device may be configured to operate with a relatively lower resistance during normal state operation, and to withstand operating conditions up to high voltages, such as 20 V, for a thin PPTC device on the order of several mils thickness. a resettable fuse, to operate with relatively low thermal derating in a low temperature state. In various embodiments, a high device is formed with a suitable polymer matrix and includes a conductive filler based upon a mixture of tungsten carbide and carbon, having a specific composition and microstructure.

FIG. 1 depicts a side cross-sectional view of a PPTC device, according to embodiments of the disclosure. The PPTC device 100 may include a PPTC body 102, disposed between a first electrode 104, disposed on a first surface of the PPTC body 102, and a second electrode 106, disposed on a second surface of the PPTC body 102, opposite the first electrode 104. The PPTC body 102 is formed of a polymer matrix 112, and a conductive filler, disposed in the polymer matrix 112.

In some non-limiting embodiments, the polymer matrix may include polyethylene copolymer, high density polyethylene, low density polyethylene, linear low density polyethylene LLDPE, ethylene-vinyl acetate copolymer EVA, ethylene-butyl acetate copolymer EBA, polyester, polyamide, polycaprolactone, polyvinylidenefluoride, polytetrafluoroethylene, ethylene-tetrafluoroethylene ETFP, or other known PPTC polymers. As well as a polymer matrix, in the embodiments to follow, a PPTC body may include various minor components, such as an antioxidant (such as IRGANOX 1010 (Pentaerythritol tetrakis (3,5-di-tert-butyl-4-hydroxyhydrocinnamate)), IRGANOX 168 (tris(2,4-di-tert-butylphenyl) phosphite), AGERITE MA (poly(1,2-dihydro-2,2,4-trimethylquinoline) etc.), arc suppressant (such as Mg(OH)2, Al(OH)3, ZnO, Zinc borate etc.), dispersion agent, cross-linker, and so forth.

According to embodiments of the disclosure, the conductive filler may include a tungsten carbide component 114 and a carbon component 116 (such as carbon black), arranged with a specific composition and microstructure, as detailed below. In various embodiments, the tungsten carbide component 114 may occupy between twenty volume percent of the PPTC body 102 and forty five volume percent of the PPTC body 102, while in particular embodiments, between thirty volume percent and forty five volume percent of the PPTC body 102. According to embodiments of the disclosure, the carbon content comprises between one and thirty volume percent of the PPTC body, and in particular embodiments between five percent and twenty volume percent of the PPTC body 102.

Figure 2:
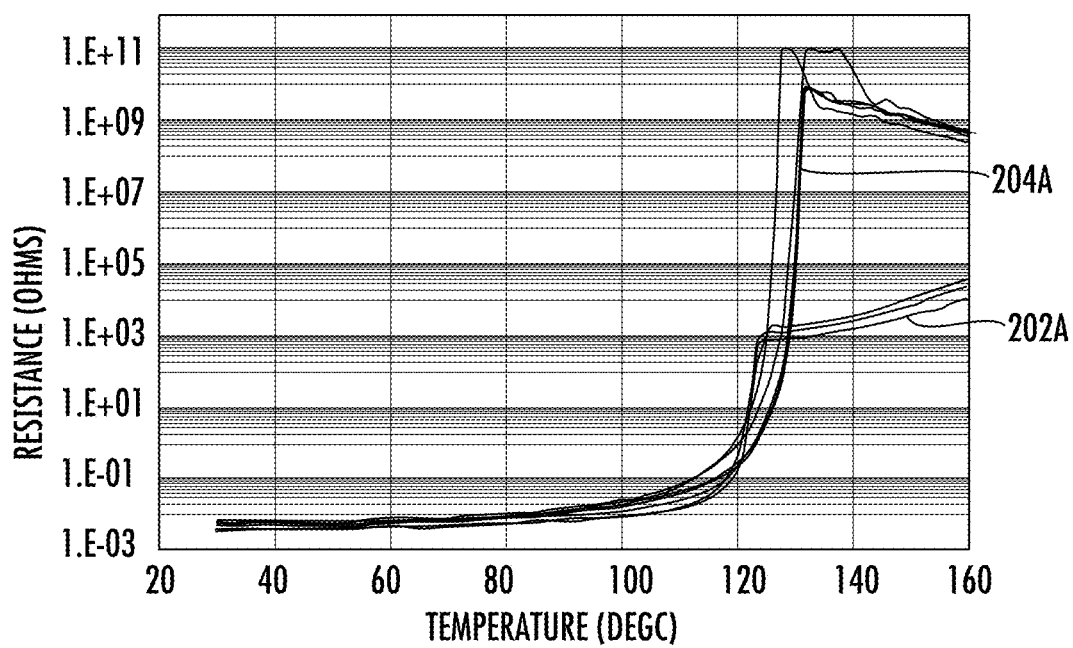
FIG. 2 depicts a graph showing electrical resistance as a function of temperature for a reference material and a PPTC material arranged according to embodiments of the disclosure.

In operation, the PPTC device 100 may be coupled to a suitable electrical circuit and/or external device via a lead 108, connected to the first electrode 104, and a lead 110, connected to a second electrode 106. The PPTC device 100 may in particular act as a switch where current is conducted through the PPTC device 100 from the first electrode 104 to second electrode 106, or vice versa, under normal state operation, where the PPTC body 102 exhibits relatively lower resistance, as shown in FIG. 2. Under a tripped state, which state may be generated by a combination of increased temperature and/or increased current through the PPTC device 100, the resistance will increase by several orders of magnitude, preventing excess current flow, and thus protecting any external component that is electrically connected to the PPTC device 100.

For certain applications, it may be desirable to maintain a low resistance for the PPTC body in the normal state. Tungsten carbide may be suitable conductive filler to provide a low resistance in the normal state for a PPTC device, such as below 0.2 ohm-cm resistivity. For certain applications, such as relatively low voltage applications, tungsten carbide-based PPTC devices may be quite suitable. However, for some applications, such as higher voltage applications, e.g., 20V, the present inventors have discovered that a tungsten carbide filled PPTC may exhibit poor resistance recovery after cycling to a tripped state.

The present inventors have discovered that when conductive filler for a PPTC body that uses a specific microstructure of carbon particles is added to a specific microstructure of tungsten carbide, at a specific composition recipe, the resulting PPTC device thus formed may exhibit both low resistance and stability against high voltage conditions. Generally, in these various embodiments, the tungsten carbide component comprises at least 30 volume percent of the PPTC body, while the total volume fraction of the conductive filler, including carbon and tungsten carbide, comprises between forty volume percent and sixty five volume percent of the PPTC body. In particular embodiments, the volume percent of the tungsten carbide component comprises between thirty volume percent and forty five volume percent of the PPTC body. In particular embodiments the volume percent of the carbon component comprises between five percent and twenty volume percent of the PPTC body.

Moreover, according to various embodiments the tungsten carbide component has a primary particle size of 0.5 to 5 micrometers (μm), and in particular embodiments, from 1 micrometer to 3 micrometers. In some embodiments, the carbon component comprises a primary particle size of 10 nm to 100 nm.

According to particular embodiments, the surface area of the carbon component may be characterized by a dibutylphthalate (DBP) volume value of 5-500 (cm$^3$/100 g), and in particular embodiments, between 40 to 200 (cm$^3$/100 g) (as defined by standard ASTM D3493).

Returning in particular to FIG. 2 there is shown the resistance vs temperature behavior for a known device based upon a carbon filler (curves 202A) and a device according to the present embodiments (curves 204A) using a conductive filler including a mixture of tungsten carbide and carbon. While both devices exhibit similar low temperature resistance (the device used for curves 204A actually has 80% lower area as compared to the device of curves 202A, as discussed below), the device according to the present embodiments, exhibits a much higher resistance at high temperature, a property that will improve the ability to withstand various stressed conditions, as detailed below.

Figure 3:
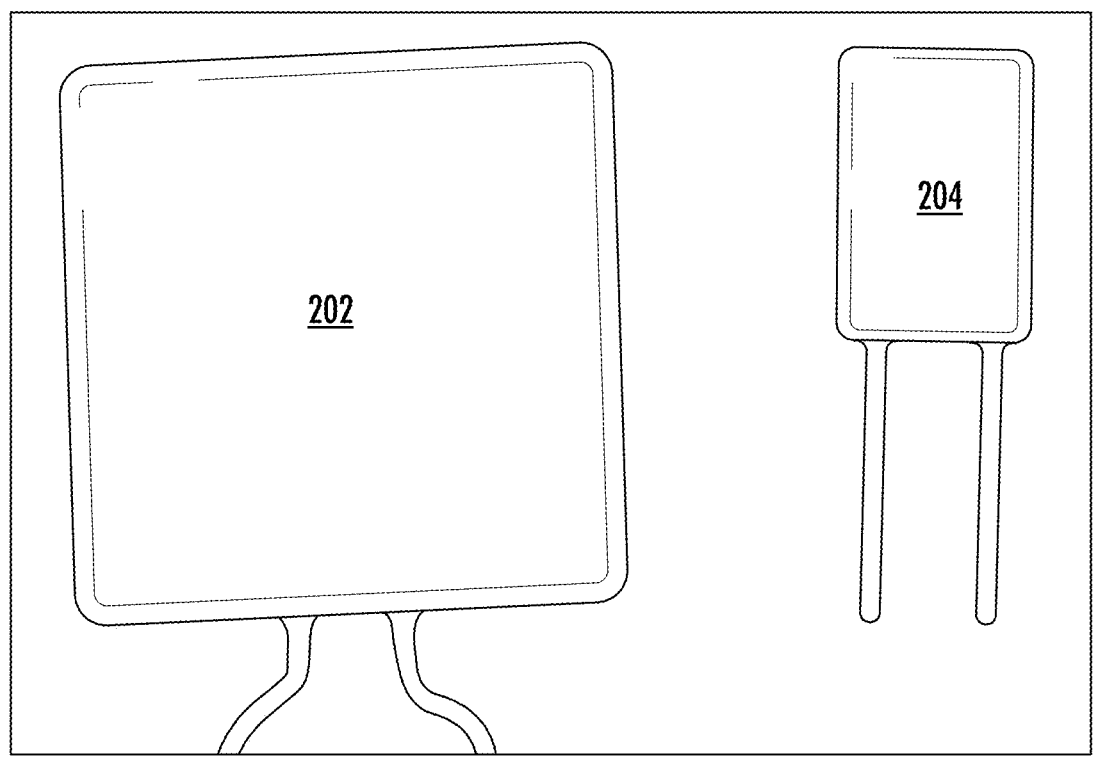
FIG. 3 depicts a comparison to a conventional PPTC device, with a device fabricated with a hybrid mixture of tungsten carbide and carbon.

FIG. 3 depicts a comparison to a conventional PPTC device, shown as device 202, with a device 204, fabricated with a hybrid mixture of tungsten carbide and carbon, as described above. The normal state resistance of the two devices is very low, and within 20% of one another, while the device has an area of 494 mm², as compared to an area of 89 mm² for the device 202.

In particular, by choice of a suitable combination of microstructure, these hybrid mixtures of tungsten carbide and carbon may impart enhanced device properties, including the ability to withstand a trip endurance test comprising a voltage of 20 V for 1000 hours, as well as the ability to maintain low resistance under a variety of performance tests.

Figure 4:
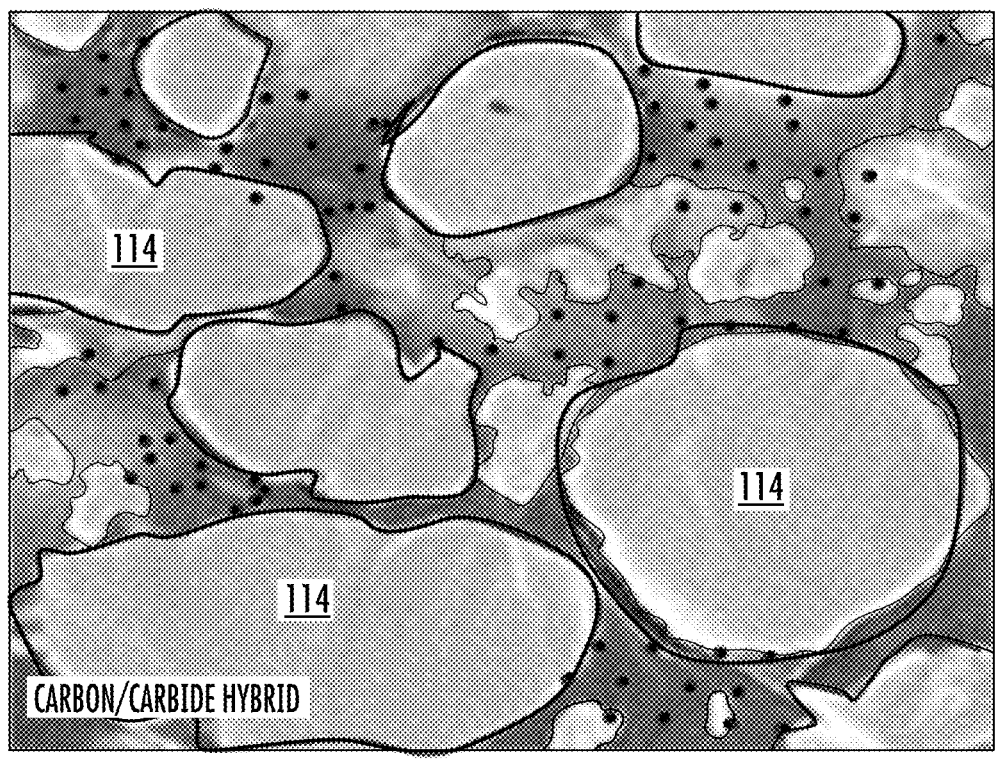
FIG. 4 depicts a cross-sectional micrograph of a PPTC body, arranged in accordance with embodiments of the disclosure.

FIG. 4 depicts a cross-sectional micrograph of a PPTC body, arranged in accordance with embodiments of the disclosure. In this case, micrometer-sized particles representing the tungsten carbide component 114 may occupy a volume fraction of approximately 40% of the PPTC body, while smaller particles, representing the carbon component, occupy a volume percent of approximately 10 percent. The properties of materials arranged generally according to the embodiment of FIG. 4 are discussed with respect to the tables to follow, in addition to the properties of some select standard PPTC materials (in Table I.).

Table I. shows a comparison of the electrical performance of select PPTC body materials that include a hybrid mixture of carbon and tungsten carbide, according to the present embodiments, and standard materials that do not include a hybrid mixture of tungsten carbide and carbon. Table I lists the overall composition of filler components, as well as the structure of the tungsten carbide filler. These filler components were mixed into a high density polyethylene (HDPE) polymer matrix to form a PPTC device that was then subject to a variety of tests. A standard, carbon-filled PPTC sample is listed as control 1, while a standard tungsten carbide-filled material having a standard 3 micrometer size particles is listed as control 2. Another tungsten carbide-filled sample with smaller, 2 micrometer size particles is listed as control 3. All of these samples have a volume fraction of conductive filler in the range of 40 percent to 48 percent. As shown, the control 1 sample (representing multiple devices), and having carbon filler, exhibits a relatively higher resistivity, or initial resistance, shown in the further column. However, the resistivity (resistance 'jump' in the final two columns refers to the ratio of final resistance to initial resistance) actually exhibits a small decrease after being subject to 200 trip cycles and thermal shock, or after 1000 hours at 85° C./85 percent humidity. However, all the devices fail a trip endurance test under 20 V after 336 hours. Thus, the carbon-filled PPTC sample may not be suitable for 20V applications.

TABLE I

Electrical performance of select PPTC body materials
Table 1. Examples of different WC type and CB loading in HDPE(high density polyethylene)

|  | WC (vol %) | CB (vol %) | Resistivity, ohm*cm | 20 V trip endurance | 20 V cycle life | Resistance jump after 85 C./85% 1000 hrs aging | Resistance jump after 200 cycles' thermal shock |
|---|---|---|---|---|---|---|---|
| control 1 | NA | CB (40%) | 0.5 | all failed in 2 wks | pass 1000 cycles | 0.87 | 0.57 |
| control 2 | WC-3.0 um (48%) | NA | 0.011 | All failed is 1 wks | All failed <10 cycles | 2.51 | 2.2 |
| control 3 | WC-2.0 um (40%) | NA | 0.16 | All failed in 1 wks | 40% failed at 100 cycles | 2.23 | 397 |
| Example 1: | WC-2.0 um (40%) | CB (10%) | 0.094 | pass 1000 hrs | pass 1000 cycles | 1.3 | 2.4 |
| Example 2: | WC-2.0 um (40%) | CB (5%) | 0.076 | 80% samples failed | All failed at 100 cycles | 1.47 | 7.25 |
| Example 3: | WC-3.0 um (33%) | CB (10%) | 0.188 | All failed in 1 wks | 80% failed at 100 cycles | 1.24 | 2.36 |

As shown, the control 2 sample (representing multiple devices), and having 48% volume fraction-3 micrometer size-tungsten carbide filler, exhibits a much lower initial resistivity. The resistivity exhibits a modest doubling or so of resistance after being subject to 200 cycles thermal shock, or after 1000 hours at 85° C./85 percent humidity, but is still very low. However, all the devices fail a trip endurance test under 20 V after 168 hours., or at 10 cycles of the trip cycle test. Thus, the 48% tungsten carbide-filled PPTC sample may also not be suitable for 20V applications.

Moreover, reducing the volume fraction of tungsten carbide slightly and reducing the particle size, as shown for control 3 sample (representing multiple devices), does not substantially improve the stability under 20 V conditions. The resistivity exhibits a modest doubling or so of resistance after being subject after 1000 hours at 85° C./85 percent humidity, but increased dramatically in response to 200 cycles thermal shock. Moreover, all the devices fail a trip endurance test under 20 V after 168 hours, and 40% fail at 100 cycles of the trip cycle test. Thus, the 40% tungsten carbide-filled PPTC sample having two micrometer particle size may also not be suitable for 20 V applications.

Turning to example 1, there is shown a formulation according to the present embodiments, where the example 1 has a conductive filler formed of 40% tungsten carbide filler at 2 micrometer particle size, together with 10% carbon. In this example, the initial resistivity is relatively low and the resistivity exhibits just a modest increase in resistance after being subject to 200 cycles and thermal shock, or after 1000 hours at 85° C./85 percent humidity, but is still low. Moreover, all the devices pass a trip endurance test under 20 V after 168 hours, or at 1000 cycles of the trip cycle test.

Turning to example 2, there is shown a formulation of a conductive filler formed of 40% tungsten carbide filler at 2 micrometer particle size, together with 5% carbon. In this example, the initial resistivity is relatively low and the resistivity exhibits just a modest increase in resistance after being subject to 200 cycles and thermal shock, or after 1000 hours at 85° C./85 percent humidity, but is still low. However, 80% of the devices fail a trip endurance test under 20 V after 168 hours, and 100% fail after 100 cycles of the trip cycle test.

Turning to example 3, there is shown a formulation of a conductive filler formed of 33% tungsten carbide filler at 2 micrometer particle size, together with 10% carbon. In this example, the initial resistivity is still relatively low and the resistivity exhibits just a modest increase in resistance after being subject to 200 cycles and thermal shock, or after 1000 hours at 85° C./85 percent humidity, but is still low. However, 100% of the devices fail a trip endurance test under 20 V after 168 hours, and 80% fail after 100 cycles of the trip cycle test. Thus, the results of Table I demonstrate that the addition of 5% carbon in general may not be sufficient to stabilize a 40% tungsten carbide filled PPTC device against certain 20 V test conditions. Additionally, these results demonstrate that the addition of 10% carbon is not sufficient to stabilize a 33% tungsten carbide filled PPTC device against certain 20 V test conditions.

Note that the addition of relatively smaller fractions of carbon to predominantly tungsten carbide conductive filler may have different effects on the device performance under 20 V testing, depending upon the microstructure of the carbon. Table II presents the results of electrical measurements of PPTC devices, all having a 40% by volume tungsten carbide filler of 2 micrometer particle size, together with added carbon. In comparison to example 2, discussed above, and having 40% by volume tungsten carbide filler of 2 micrometer particle size, without 5% added carbon, the example 4 has the same overall tungsten carbide composition, particle size, and same overall carbon content. However, in example 4 the carbon filler has a microstructure that exhibits a relatively lower DBP value (in this case, 24) in comparison to example 2. As a result, all the devices of the example 4 passed the aforementioned 20V trip endurance test at 1000 hours and trip cycle test at 1000 cycles.

Moreover, regarding sample 5, this sample has a similar carbon composition and similar tungsten carbide composition and microstructure as in comparison to example 1, discussed above, which sample has 40% by volume tungsten carbide filler of 2 micrometer particle size, with 10% added carbon. However, in the example 5 the carbon filler has a microstructure that exhibits a relatively higher DBP value (specifically, 1500) in comparison to the carbon filler of example 1, which sample exhibits DBP value in the range of 110. As a result, all the devices of the example 5 failed the aforementioned 20V trip endurance test at 168 hours and trip cycle test at 10 cycles. Thus, table II demonstrates the unexpected discovery that providing a small amount of carbon with a microstructure generating a relatively lower DBP value improves the ability to withstand the 20V test conditions, while providing a small amount of carbon with a microstructure generating a relatively higher DBP value degrades the ability to withstand the 20V test conditions.

Table III presents the results of electrical measurements of PPTC devices, all having a 42% by volume tungsten carbide filler of 2 micrometer particle size, together with added carbon, for four different volume fractions of carbon. In this case, unlike the samples of tables I and II, the polymer matrix is ETFE, rather than HDPE. In comparison to example 2, discussed above, and having 40% by volume tungsten carbide filler of 2 micrometer particle size, with 5% added carbon, the example 6 has the same tungsten carbide particle size, and same overall carbon content. However, in example 6 the volume fraction of tungsten carbide is 2% higher than example 2. This slight additional increase in tungsten carbide content (in addition to the polymer matrix being different) results in all of the devices passing the 20V trip endurance and trip cycle tests as shown. The thermal shock test does result in a 19 fold increase in the final resistance. However, this increase in resistance is much lower than in the case of pure 40% tungsten carbide filler of example 3 (397 fold increase), indicating that 5% added carbon filler is a nearly sufficient amount to suppress the poor thermal shock performance observed for PPTC devices of tungsten carbide filler of similar composition. As further shown in table III, as the small amount of added carbon in increased to 10% (example 7) and to 15% (example 8) the PPTC devices thus formed pass all the 20 V trip endurance test, trip cycle test, and exhibit relatively more stable resistance after thermal shock, with increasing carbon content. In this regard, note that the electrical performance for example 7 is nearly the same as the performance of sample 1, where the conductive filler composition and microstructure is nominally the same. This result indicates that the present approach to improved 20 V performance while preserving low resistance using composite tungsten carbide and carbon filler may be expected to yield similar results for a variety of polymer matrix. However, the addition to tungsten carbide filler of substantial amounts of carbon beyond 15% or so, in order to preserve low resistivity after thermal shock, may not be effective to preserve integrity of the PPTC devices 20 V trip conditions. In this regard, as shown in sample 9, at 20% added carbon, the devices thus formed fail the trip endurance test at 168 hours. Note that while processing PPTC samples having 20% carbon by volume fraction, the PPTC mixture exhibits very high viscosity, so that formation of a stable PPTC material is difficult, resulting in the slight degradation in the electrical performance as compared to 15% by volume carbon. Thus, for 20V stable operation of a PPTC device using an ETFE matrix, a carbon volume fraction of approximately twenty percent may be an upper bound for carbon content when added to 42% volume fraction tungsten carbide filler. Of course, the exact volume fraction of carbon above which performance may degrade may vary slightly depending upon the DBP number, the exact volume percent of tungsten carbide, as well as particle size of tungsten carbide, and nature of the polymer matrix.

TABLE II

Electrical performance of select PPTC body materials having 40% tungsten carbide filler with added carbon
Table 2. Examples of 40% WC with different type CB in HDPE(high density polyethylene)

|  | WC (vol %) | CB (vol %) | Resistivity, ohm*cm | 20 V trip endurance | 20 V cycle life | Resistance jump after 85 C./85% 1000 hrs aging | Resistance jump after 200 cycles' thermal shock |
|---|---|---|---|---|---|---|---|
| Example 1: | WC-2.0 um (40%) | CB (10%) | 0.094 | pass 1000 hrs | pass 1000 cycles | 1.3 | 2.4 |
| Example 4: | WC-2.0 um (40%) | CB-low DBF (5%) | 0.176 | pass 1000 hrs | pass 1000 cycles | 2.45 | 90.6 |
| Example 5: | WC-2.0 um (40%) | CB-high DBP (20%) | 0.112 | All failed in 1 wks | All failed <10 cycles | 1.94 | 4.97 |

TABLE III

Electrical performance of select PPTC body materials having
42% tungsten carbide filler in ETFE matrix with added carbon

|  | WC (vol %) | CB (vol %) | Resistivity, ohm*cm | 24 V trip endurance | 24 V cycle life | Resistance jump after 200 cycles' thermal shock |
|---|---|---|---|---|---|---|
| Example 6: | WC-2.0 um (42%) | CB (5%) | 0.176 | pass 1000 hrs | pass 1000 cycles | 19.2 |
| Example 7: | WC-2.0 um (42%) | CB (10%) | 0.146 | pass 1000 hrs | pass 1000 cycles | 2.79 |
| Example 8: | WC-2.0 um (42%) | CB (15%) | 0.149 | pass 1000 hrs | pass 1000 cycles | 0.98 |
| Example 9: | WC-2.0 um (42%) | CB (20%) | 0.152 | All failed in 1 wks | pass 1000 cycles | 0.71 |

In summary, the present embodiments provide PPTC devices suitable for low resistance, high voltage applications, by adding a small fraction of carbon particles with a select microstructure to a tungsten carbide filler having a given volume fraction and particle size. As a result, smaller PPTC devices using the inventive compositions of the present embodiments may be fabricated for the same high voltage application.

Without limitation to any particular theory, it is believed that the addition of small amounts of carbon result in dispersion around the larger tungsten carbide particles to improve resistance stability after thermal shock or repeated cycling, as well as to reduce the chances of arcing of carbide particles subject to high voltage. This ability to withstand high voltage conditions is enhanced by selecting carbon filler having microstructure that generates relatively lower DBP volume, and may be degraded by selecting carbon filler having microstructure that generates relatively higher DBP volume.

While the present embodiments have been disclosed with reference to certain embodiments, numerous modifications, alterations and changes to the described embodiments are possible while not departing from the sphere and scope of the present disclosure, as defined in the appended claims. Accordingly, the present embodiments are not to be limited to the described embodiments, and may have the full scope defined by the language of the following claims, and equivalents thereof.

What is claimed is:

1. A polymer positive temperature coefficient (PPTC) device, comprising:
   a PPTC body; and
   a first electrode disposed on a first surface of the PPTC body and a second electrode disposed on a second surface of the PPTC body, opposite the first electrode, the PPTC body comprising:
      a polymer matrix; and
      a conductive filler, disposed in the polymer matrix, wherein the conductive filler comprises:
         a tungsten carbide component; and
         a carbon component,
         wherein the tungsten carbide component comprises between thirty volume percent and forty five volume percent of the PPTC body and has a primary particle size of 0.5 μm to 5 μm,
         wherein the carbon component comprises between five volume percent and twenty volume percent of the PPTC body and has a primary particle size of 10 nm to 100 nm, and
         wherein a total volume fraction of the conductive filler comprises between forty volume percent and sixty five volume percent of the PPTC body.

2. The PPTC device of claim 1, wherein the tungsten carbide component comprises a particle size of 1 micrometer to 3 micrometers.

3. The PPTC device of claim 1, wherein the carbon component defines a dibutylphthalate volume of 40 to 200 (cm$^3$/100 g).

4. The PPTC device of claim 1, wherein the polymer matrix comprises: polyethylene copolymer, high density polyethylene, low density polyethylene, linear low density polyethylene, ethylene-vinyl acetate copolymer, ethylene-butyl acetate copolymer, polyester, polyamide, polycaprolactone, polyvinylidenefluoride, polytetrafluoroethylene, or ethylene-tetrafluoroethylene.

5. The PPTC device of claim 1, wherein the PPTC body is configured to withstand a trip endurance test comprising a voltage of 20 V for 1000 hours.

6. The PPTC device of claim 1, wherein the PPTC body is configured to withstand a trip cycle test of voltage of 20 V for 1000 cycles.

7. The PPTC device of claim 1, wherein the PPTC body is configured to exhibit a final resistance that is no greater than three times an initial resistance after 200 trip cycles and a thermal shock treatment.

8. The PPTC device of claim 1, wherein the PPTC body configured to exhibit a final resistance that is no greater than three times an initial resistance after 1000 hours at 85° C./85 percent relative humidity.

9. A composition for forming a polymer positive temperature coefficient (PPTC) body in a PPTC device, comprising:
   a polymer matrix; and
   a conductive filler, disposed in the polymer matrix, wherein the conductive filler comprises:
      a tungsten carbide component; and
      a carbon component,
      wherein the tungsten carbide component comprises between thirty volume percent and forty five volume percent of the PPTC body and has a primary particle size of 0.5 μm to 5 μm,
      wherein the carbon component comprises between five volume percent and twenty volume percent of the PPTC body and has a primary particle size of 10 nm to 100 nm, and
   wherein a total volume fraction of the conductive filler comprises between forty volume percent and sixty five volume percent of the PPTC body.

10. The composition of claim 9, wherein the tungsten carbide component comprises a particle size of 1 micrometer to 3 micrometers.

11. The composition of claim 9, wherein the carbon component defines a dibutylphthalate volume of 40 to 200 (cm$^3$/100 g).

12. A method of forming a polymer positive temperature coefficient (PPTC) body for a PPTC device, comprising:
   providing a polymer matrix; and
   adding a conductive filler to the polymer matrix, wherein the conductive filler comprises:
      a tungsten carbide component; and
      a carbon component,
      wherein the tungsten carbide component comprises between thirty volume percent and forty five volume percent of the PPTC body and has a primary particle size of 0.5 μm to 5 μm,
      wherein the carbon component comprises between five volume percent and twenty volume percent of the PPTC body and has a primary particle size of 10 nm to 100 nm, and
   wherein a total volume fraction of the conductive filler comprises between forty volume percent and sixty five volume percent of the PPTC body.

\* \* \* \* \*